(12) United States Patent
Brillon

(10) Patent No.: US 8,282,285 B2
(45) Date of Patent: Oct. 9, 2012

(54) BEARING SUPPORT

(75) Inventor: Louis Brillon, Varennes (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 569 days.

(21) Appl. No.: 12/434,911

(22) Filed: May 4, 2009

(65) Prior Publication Data

US 2010/0278469 A1  Nov. 4, 2010

(51) Int. Cl.
  *F16C 23/00* (2006.01)
(52) U.S. Cl. .......... 384/215; 384/535; 384/581
(58) Field of Classification Search .......... 384/535, 384/536, 202, 215, 428, 581, 582; 403/225, 403/228
  See application file for complete search history.

(56) References Cited

U.S. PATENT DOCUMENTS

| | | | |
|---|---|---|---|
| 3,063,761 A | 11/1962 | Hoddy et al. | |
| 3,318,642 A * | 5/1967 | Peterson | 384/215 |
| 3,743,365 A * | 7/1973 | Kato | 384/536 |
| 3,980,352 A | 9/1976 | Carlson | |
| 4,119,874 A | 10/1978 | Beavers et al. | |
| 4,262,975 A | 4/1981 | Heshmat et al. | |
| 4,300,806 A | 11/1981 | Heshmat | |
| 4,325,650 A * | 4/1982 | Masai | 403/372 |
| 4,636,106 A * | 1/1987 | Waisbrod | 403/228 |
| 4,799,653 A | 1/1989 | Kramer | |
| 4,872,767 A * | 10/1989 | Knapp | 384/99 |
| 5,498,083 A | 3/1996 | Brown | |
| 5,803,441 A | 9/1998 | Yamamoto | |
| 6,155,720 A * | 12/2000 | Battig | 384/99 |
| 6,224,533 B1 * | 5/2001 | Bengtsson et al. | 494/82 |
| 6,964,521 B2 | 11/2005 | McDearmon | |
| RE39,190 E | 7/2006 | Weissert | |
| 7,828,512 B2 * | 11/2010 | Eilers et al. | 415/104 |

* cited by examiner

Primary Examiner — William C Joyce
(74) Attorney, Agent, or Firm — Norton Rose Canada LLP

(57) ABSTRACT

A bearing support provides a circumferentially-extending structure to substantially transmit a radial bearing load to a housing when a radial deflection/deformation of the circumferentially-extending structure caused by the radial bearing load, is within a predetermined limit. The bearing support provides a direct support link bypassing the circumferentially-extending structure to transmit an over-limit portion of the radial bearing load to the housing when the radial deflection/deformation of the circumferentially-extending structure reaches the predetermined limit.

13 Claims, 3 Drawing Sheets

BEARING SUPPORT

TECHNICAL FIELD

The application relates generally to a bearing support and, more particularly, to a bearing support for a bearing used to support a shaft in a gas turbine engine.

BACKGROUND OF THE ART

Deformable bearing supports are provided to dampen forces resulting from shocks, impacts, and vibrations attributable to rotating shafts. Bearing supports are usually designed to accommodate maximum attainable forces, necessitating higher expense for large capacity bearings, even though, for the vast majority of operating conditions, more compliant bearings are satisfactory. Accordingly, there is a need to provide an improved bearing support.

SUMMARY

In one aspect, there is provided a bearing support for radially supporting a rotatable shaft bearing within a housing, the bearing support comprising: a first portion and a second portion, the first portion being more flexible than and supported by the second portion, the first portion including a circumferentially-extending structure provided radially between and spaced apart from the bearing and the housing to provide said more flexibility; wherein the first and second portions transmit a radial bearing load to the housing substantially through the circumferentially-extending structure, causing a radial deflection/deformation of the first portion within a predetermined limit; and wherein the second portion provides a direct link bypassing the circumferentially-extending structure to transmit an over-limit portion of the radial bearing load to the housing when the radial deflection/deformation of the first portion reaches said predetermined limit.

In another aspect, there is provided bearing support for radially supporting a rotatable shaft bearing within a housing, the bearing support comprising: an inner ring for accommodating the bearing and an outer ring for being received within the housing, the inner and outer rings defining an annulus therebetween; a circumferentially-extending structure disposed within the annulus and radially spaced apart from the respective inner and outer rings; a plurality of radial support members for supporting the circumferentially-extending structure in place; wherein the bearing support transmits a radial bearing load to the housing substantially through the circumferentially-extending structure, causing a radial deflection/deformation of the circumferentially-extending structure within a predetermined limit; and wherein the radial support members provide a direct link radially crossing the annulus and bypassing the circumferentially-extending structure to transmit an over-limit portion of the radial bearing load to the housing when the radial deflection/deformation of the circumferentially-extending structure reaches said predetermined limit.

In a further aspect, there is provided method for supporting a rotatable shaft bearing within a housing, comprising: (a) establishing a first support link to transmit a radial bearing load to the housing substantially through a circumferentially-extending structure, causing a radial deflection/deformation of the structure within a predetermined limit when the radial bearing load is less than a predetermined value; and (b) establishing a second support link bypassing the circumferentially-extending structure to transmit the radial bearing load to the housing when the radial bearing load is equal to or more than the predetermined value, thereby causing the radial deflection/deformation of the structure to reach said limit.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
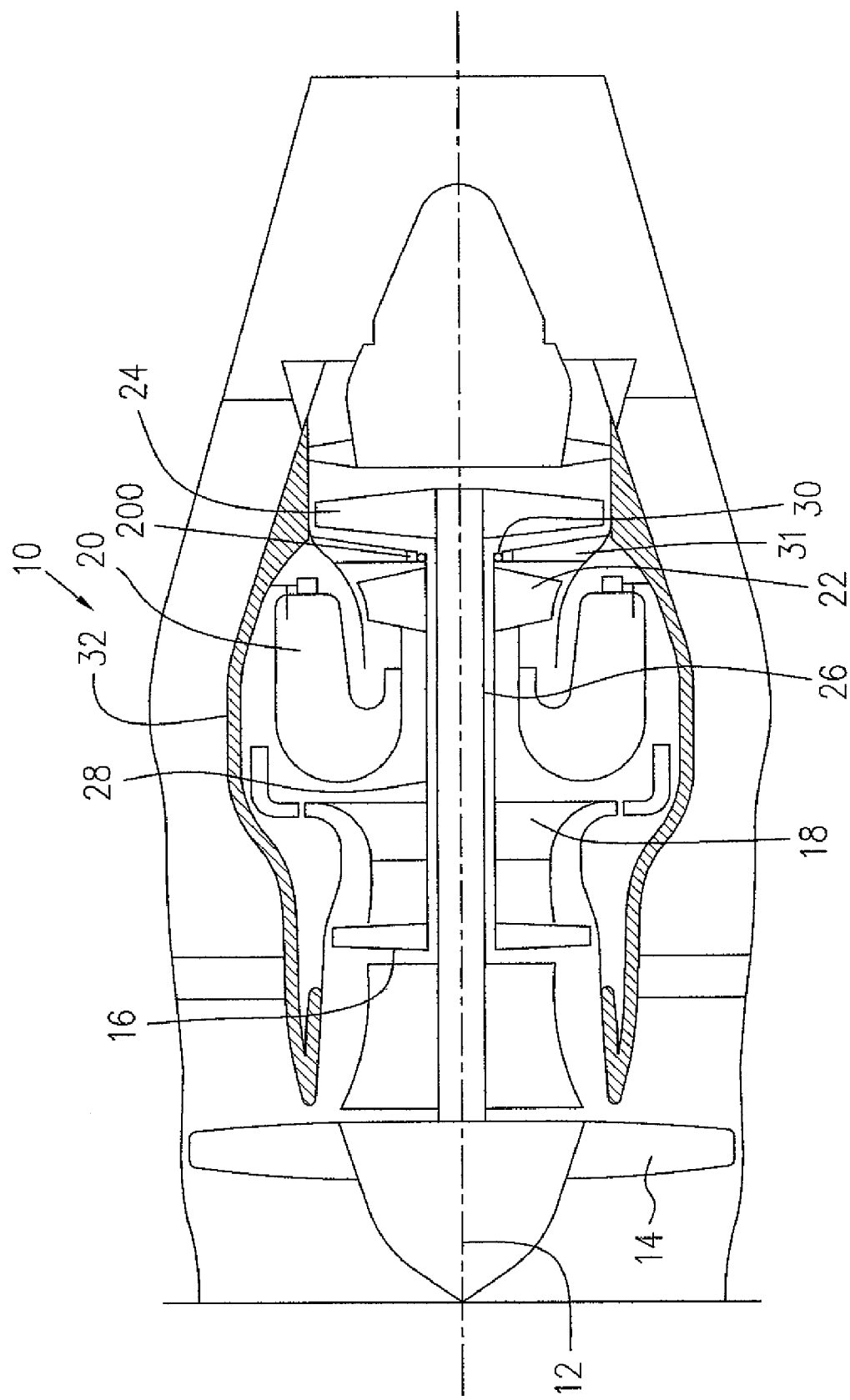
FIG. 1 is a schematic cross-sectional view of a gas turbine engine.

Referring to FIG. 1, an exemplary gas turbine engine 10 includes in serial flow communication about a longitudinal central axis 12, fan or rotor blades 14, a conventional low pressure compressor 16, a conventional high pressure compressor 18, a conventional annular combustor 20, a conventional high pressure turbine 22, and a conventional low pressure turbine 24. The low pressure turbine 24 is securely connected to both the low pressure compressor 16 and the fan blades 14 by a first rotor shaft 26, and the high pressure turbine 22 is securely connected to the high pressure compressor 18 by a second rotor shaft 28. The first and second rotor shafts 26, 28 are supported by respective bearing members, one of which shown as an example, is indicated by numeral 30. The bearing member 30 may be supported by a bearing support which may also be part of the bearing member 30. The bearing member 30 may be supported by a stationary structure, for example by a housing 31 which is supported within an annular casing 32 of the engine.

Figure 2:
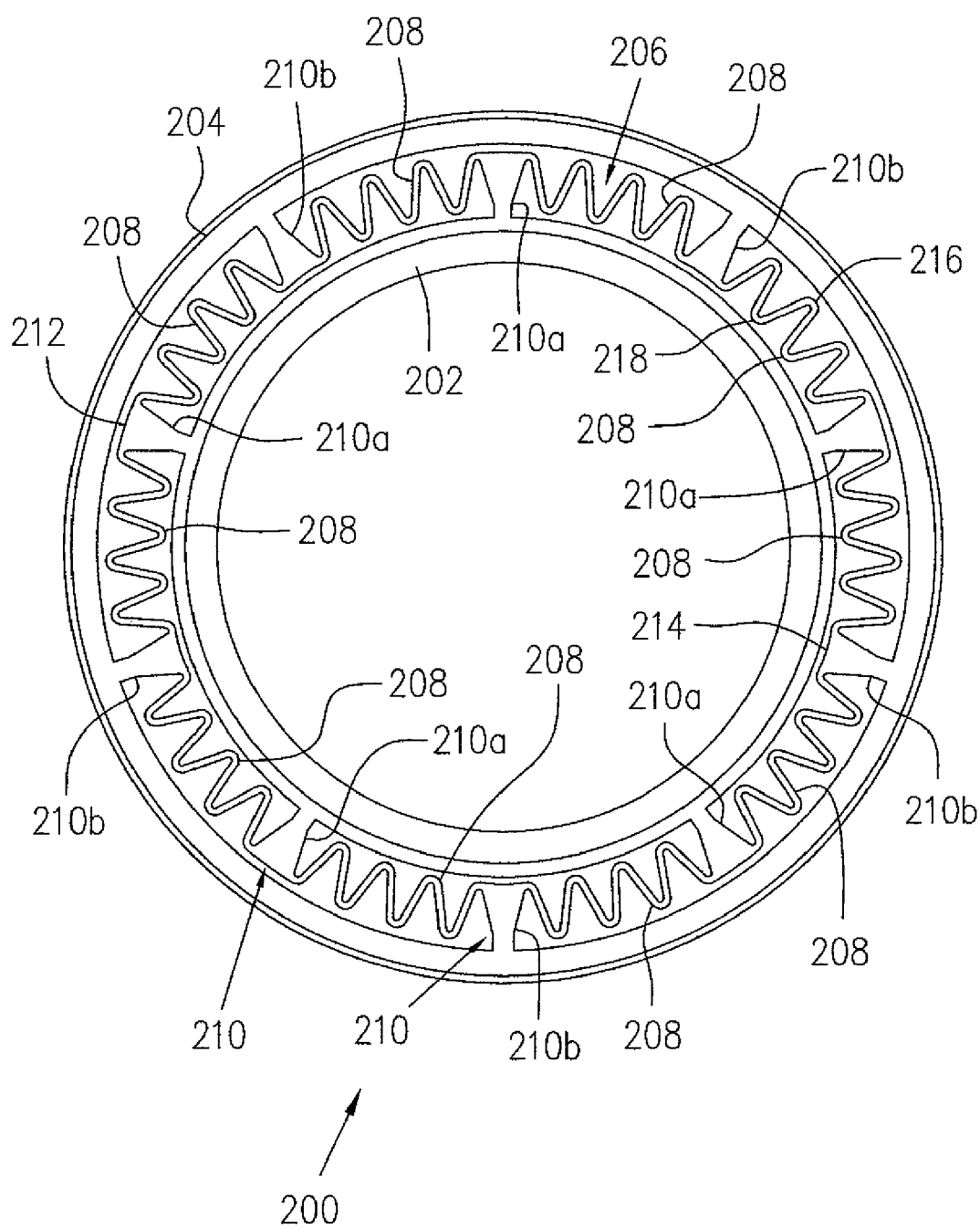
FIG. 2 an elevation view, taken from one end of a bearing support member used as part of a bearing member to support a shaft in a gas turbine engine.
Figure 3:
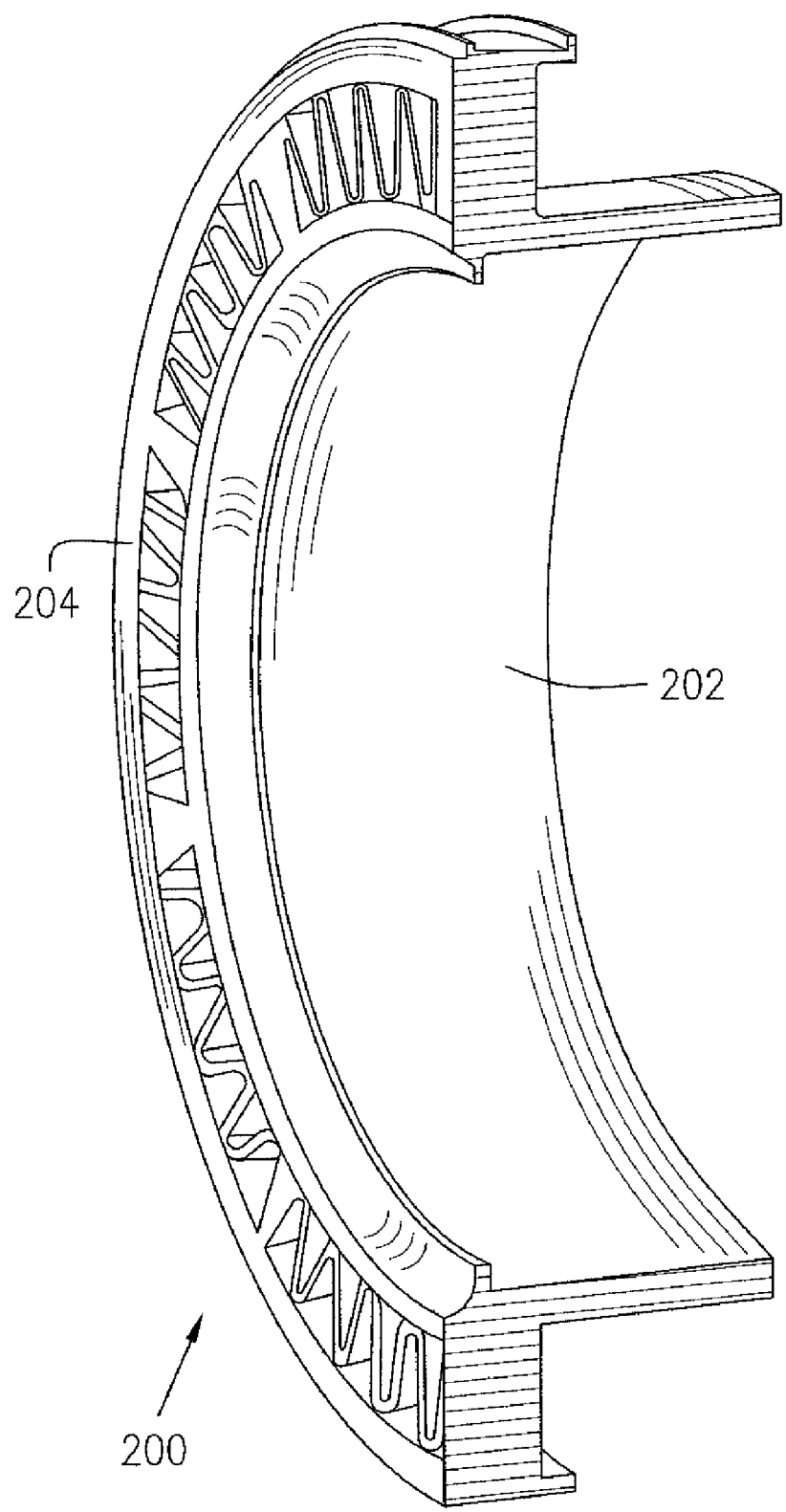
FIG. 3 is a sectional perspective view, taken from one end of a bearing support member used as part of a bearing member to support a shaft in a gas turbine engine.

Referring to FIGS. 1-3, the bearing support 200 according to one embodiment, may have an inner ring 202 for accommodating the bearing member 30 and an outer ring 204 for being received within the housing 31. The inner and outer rings 202, 204 define an annulus (not numbered) therebetween. A circumferentially-extending structure 206 is disposed in the annulus and is radially spaced apart from the respective inner and outer rings 202, 204. A plurality of radial support members 210 are provided for supporting the circumferentially-extending structure 206 in place. Therefore, where a radial bearing load is less than a predetermined value, the bearing support 200 transmits the radial bearing load to the housing 31 substantially through the circumferentially-extending structure 206, thereby causing a radial deflection/deformation of the circumferentially-extending structure 206 within a predetermined limit. When the radial bearing load is greater than the predetermined value causing radial deflection/deformation of the circumferentially-extending structure 206 to reach the predetermined limit, the bearing support 200 provides a direct support link through at least one of the radial support members 210 bypassing the circumferentially-extending structure 206, to transmit an over-limit portion of the radial bearing load to the housing 31. The circumferentially-extending structure 206 may include a bend 208 configured in a wave-like shape in order to provide more flexibility with respect to the radial support members 210. The circumferentially-extending structure 206 may also include a plurality of circumferential sections (not numbered), each being connected at opposed ends to the respective inner and outer rings 202, 204 by two adjacent said radial support members 210. Each of the radial support members 210 may be connected to two adjacent said circumferential sections of the circumferentially-extending structure 206. Therefore, the connection of the respective radial support members 210 to the circumferential sections of the circumferentially-extending structure 206 forms a complete loop along the annulus between the inner and outer rings 202, 204.

The radial support members 210 may further include a group of inner radial support members 210a extending radially between the inner ring 202 and the circumferentially-extending structure 206, and a group of outer radial support members 210b extending radially between the outer ring 204 and the circumferentially-extending structure 206. The inner and outer radial support members 210a and 210b are alternately distributed in the annulus and are circumferentially spaced apart one from another.

Each of the inner radial support members 210a may be connected at an inner end thereof to the inner ring 202 and may be connected at an outer end thereof to the circumferentially-extending structure 206. Each of the outer radial support members 210b may be connected at an outer end thereof to the outer ring 204 and may be connected at an inner end thereof to the circumferentially-extending structure 206. The outer end of each inner radial support member 210a may be radially spaced apart from the outer ring 204, thereby defining a first radial gap 212 therebetween. Similarly, the inner end of each outer radial support member 210b may be radially spaced apart from the inner ring 202, thereby defining a second radial gap 214 therebetween. The first and second radial gaps 212, 214 may optionally be equal.

The circumferentially-extending structure 206 may be radially spaced apart from the outer ring 204, thereby defining a minimum outer radial gap 216 such as in a location of the respective outer top tip (not numbered) of the wave-shaped configuration, between the circumferentially-extending structure 206 and the outer ring 204. The minimum outer radial gap 216 may be optionally greater than the first radial gap 212 between the outer end of each radial support member 210a and the outer ring 204. Similarly, the circumferentially-extending structure 206 may be radially spaced apart from the inner ring 202, thereby defining a minimum inner radial gap 218 such as in a location of the respective inner top tips (not numbered) of the wave-shaped configuration, between the circumferentially-extending structure 206 and the inner ring 202. The inner minimum radial gap 218 may be optionally greater than the second radial gap 214 between the inner end of each radial support member 210b and the inner ring 202.

In use of the bearing support 200, a bearing load (which includes a substantially radial component) on the respective inner radial support members 210a through the connected inner ring 202, is transmitted substantially in both circumferential directions to the respective outer radial support members 210b. The respective outer radial support members 210b then transmit this bearing load through the connected outer ring 204, to the housing 31 (see FIG. 1) of the engine 10. During transmission of this bearing load, the circumferentially-extending structure 206 under the force of the transmitted bearing load, is deflected and deformed due to the relatively greater flexibility provided by the wave-shaped configuration thereof. Such a deflection/deformation of the circumferentially-extending structure 206 causes radial movement of at least one inner radial support member 210a or one outer radial support member 210b relative to the respective outer and inner ring 204, 202, thereby decreasing the size of the associated one of the first radial gaps 212 or one of the inner radial gaps 214. Due to the relatively greater flexibility of the circumferentially-extending structure 206 which provides a desirable flexibility of the bearing support 200, the dynamic components included in the bearing load such as vibration may be absorbed by the deflection/deformation of the circumferentially-extending structure 206 and may not be transmitted to the housing 31 (see FIG. 1) of the engine 10.

Nevertheless, also due to the relatively greater flexibility of the circumferentially-extending structure 206, the deflection/deformation of the circumferentially-extending structure 206 will reach a limit in which at least one of the first radial gaps 212 or second radial gaps 214 is closed when the transmitted bearing load (particularly the radial component thereof) is greater than a predetermined value. The closed one of the first or second radial gaps 212, 214 allows a direct contact of the associated one of the inner or outer radial support members 210a, 210b with both the inner and outer rings 202, 204 in order to establish a direct support link radially crossing the annulus and bypassing the circumferentially-extending structure 206 in order to transmit an over limit portion of the bearing load to the housing 31. The over limit portion of the bearing load is the amount of bearing load exceeding the predetermined value.

The option to have the minimum radial gaps 216, 218 between the circumferentially-extending structure 206 and the respective outer and inner rings 204, 202 greater than the respective first and second radial gaps 212, 214, is to ensure that at least one of the first or second radial gaps 212, 214 is closed before any one of the minimum radial gaps 216, 218 is closed, caused by the deflection/deformation of the circumferentially-extending structure 206. However, this option may not be necessary because an over-limit portion of the bearing load may be transmitted from the inner ring 202 to the outer ring 204 through a direct contact between the circumferentially-extending structure 206 and the respective inner and outer ring 202, 204 due to closed minimum radial gaps 216, 218.

It should be noted that the dynamic components of the bearing load may also include for example, circumferential components. The wave-shaped circumferentially-extending structure 206 is also enabled to be deflectable/deformable in the circumferential direction to absorb the energy of those components. For the same purpose, the inner and outer radial support members 210a, 210b may have a reduced circumferential dimension at one end to which the respective inner and outer rings 202, 204 are connected, as shown in FIG. 2. Therefore, the reduced size of the connection ends (not numbered) of the respective inner and outer radial support members 210a and 210b provide some resiliency in the circumferential direction.

The inner and outer rings 202, 204 may further includes flanges (not numbered) which are optional designs for installation of the bearing support 200 within the engine 10 of FIG. 1.

The bearing support 200 may be made of any material which is structurally adequate for the expected temperature at the bearing location in the engine 10. The material of the bearing support also allows the fabrication of the wave-shaped circumferential sections of the circumferentially-extending structure 206. For example, circumferentially-extending structure 206 could be made of steel and the wave-shaped configuration could be manufactured by wire electric discharge machining (EDM). The remaining geometry of the bearing support 200 could be manufactured using standard machining practices.

The above description is meant to be exemplary only, and one skilled in the art will recognize that changes may be made to the embodiments described without departing from the scope of the disclosed subject matter. For example, the circumferentially-extending structure of the bearing support according to the above-described embodiment, includes wave-shaped circumferential sections, however other configurations such as spring bands, etc. may also be used as the circumferentially extending structure. A turbofan gas turbine engine is illustrated as an example for application of this bearing support. However, the described bearing support may be applicable to various types of gas turbine engines. Modifications which fall within the scope of the described subject matter will be apparent to those skilled in the art in light of a review of this disclosure and such modifications are intended to fall within the appended claims.

What is claimed is:

1. A bearing support for radially supporting a rotatable shaft bearing within a housing, the bearing support comprising:
   a first portion and a second portion, the first portion being more flexible than and supported by the second portion, the first portion including a circumferentially-extending structure provided radially between and spaced apart from the bearing and the housing to provide said more flexibility, the circumferentially-extending structure including a plurality of circumferential sections each having circumferentially opposed ends, adjacent said sections being connected end-to-end to form a complete loop around the bearing;
   wherein the first and second portions transmit a radial bearing load to the housing substantially through the circumferentially-extending structure, causing a radial deflection/deformation of the first portion within a predetermined limit;
   wherein the second portion provides a direct link bypassing the circumferentially-extending structure to transmit an over-limit portion of the radial bearing load to the housing when the radial deflection/deformation of the first portion reaches said predetermined limit, the second portion including a plurality of inner and outer radial support members alternately positioned and circumferentially spaced apart from one another, the inner radial support members supporting the circumferentially-extending structure of the first portion on the bearing and the outer radial support members supporting the circumferentially-extending structure within the housing; and
   wherein each of the circumferential sections of the circumferentially-extending structure of the first portion comprises a band configured in a wave shape, the wave shaped band extending between the circumferentially opposed ends of each section.

2. The bearing support as defined in claim 1 wherein the second portion further comprises an inner ring for receiving the bearing therein and an outer ring for being received within the housing.

3. The bearing support as defined in claim 2 wherein the inner and outer rings define an annulus therebetween for receiving the circumferentially-extending structure and the inner and outer radial support members.

4. The bearing support as defined in claim 3 wherein each of the inner radial support members is connected at an inner end thereof to the inner ring and at an outer end thereof to the circumferentially-extending structure, and wherein each of the outer radial support members is connected at an outer end thereof to the outer ring and at an inner end thereof to the circumferentially-extending structure.

5. The bearing support as defined in claim 4 wherein the outer end of each inner radial support member is radially spaced apart from the outer ring, thereby defining a first radial gap therebetween, and wherein the inner end of each outer radial support member is radially spaced apart from the inner ring, thereby defining a second radial gap therebetween.

6. The bearing support as defined in claim 4 wherein at least one of the first and second radial gaps is closed in order to allow at least one of the inner or outer radial support members to contact both outer and inner rings when the radial deflection/deformation of the first portion reaches said predetermined limit.

7. The bearing support as defined in claim 4 wherein the first and second radial gaps are substantially equal.

8. The bearing support as defined in claim 5 wherein the circumferentially-extending structure is radially spaced apart from the outer ring, thereby defining a minimum outer radial gap therebetween, the minimum outer radial gap being greater than the first radial gap.

9. The bearing support as defined in claim 5 wherein the circumferentially-extending structure is radially spaced apart from the inner ring, thereby defining a minimum inner radial gap therebetween, the minimum inner radial gap being greater than the second radial gap.

10. The bearing support as defined in claim 4 wherein the circumferentially opposed ends of each section of the circumferentially-extending structure are connected to one of the inner radial support members and to one of the outer radial support members, respectively.

11. A bearing support for radially supporting a rotatable shaft bearing within a housing, the bearing support comprising:
    an inner ring for accommodating the bearing and an outer ring for being received within the housing, the inner and outer rings defining an annulus therebetween;
    a circumferentially-extending structure disposed within the annulus and radially spaced apart from the respective inner and outer rings, the circumferentially-extending structure including a plurality of circumferential sections each having circumferentially opposed ends, adjacent said sections being connected end-to-end to form a complete loop along the annulus, each of the circumferential sections including a band configured in a wave shape, the wave shaped band extending between the circumferentially opposed ends of each section;
    a plurality of radial support members for supporting the circumferentially-extending structure in place;
    wherein the bearing support transmits a radial bearing load to the housing substantially through the circumferentially-extending structure, causing a radial deflection/deformation of the circumferentially-extending structure within a predetermined limit; and wherein the radial support members provide a direct link radially crossing the annulus and bypassing the circumferentially-extending structure to transmit an over-limit portion of the radial bearing load to the housing when the radial deflection/deformation of the circumferentially-extending structure reaches said predetermined limit, each of the radial support members joining one of the end-to-end connections of the respective adjacent sections of the circumferentially-extending structure.

12. The bearing support as defined in claim 11 wherein the circumferentially-extending structure is more flexible than the redial support members.

13. The bearing support as defined in claim 11 wherein the radial support members comprise inner radial support members radially extending between the inner ring and the circumferentially-extending structure, and outer radial support members extending radially between the outer ring and the circumferentially-extending structure, the inner and outer radial support members being positioned alternately in the annulus.

* * * * *